(12) United States Patent
Wei (10) Patent No.: US 11,360,254 B2
(45) Date of Patent: Jun. 14, 2022

(54) OPTICAL FILM, FABRICATION METHOD THEREOF, WINDSHIELD AND DRIVING APPARATUS

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 187 days.

(21) Appl. No.: 16/621,716

(22) PCT Filed: Feb. 22, 2019

(86) PCT No.: PCT/CN2019/075789
§ 371 (c)(1),
(2) Date: Dec. 12, 2019

(87) PCT Pub. No.: WO2019/223375
PCT Pub. Date: Nov. 28, 2019

(65) Prior Publication Data
US 2021/0141136 A1   May 13, 2021

(30) Foreign Application Priority Data

May 23, 2018 (CN) .......................... 201810502994.5

(51) Int. Cl.
*G02B 5/30* (2006.01)
*G02B 27/01* (2006.01)
*B60K 35/00* (2006.01)

(52) U.S. Cl.
CPC ............ *G02B 5/3083* (2013.01); *B60K 35/00* (2013.01); *G02B 5/3016* (2013.01); *G02B 27/0101* (2013.01); *B60K 2370/1529* (2019.05)

(58) Field of Classification Search
CPC .. G02B 5/3083; G02B 5/3016; G02B 5/3008; G02B 5/30; G02B 5/3025;
(Continued)

(56) References Cited

U.S. PATENT DOCUMENTS 5,486,949 A * 1/1996 Schrenk ................. B32B 27/08
359/489.12
5,827,449 A * 10/1998 Hanelt ................ C09K 19/408
252/299.62

(Continued)

FOREIGN PATENT DOCUMENTS

CN          1904698 A      1/2007
CN        103885173 A      6/2014
(Continued)

OTHER PUBLICATIONS

First Office Action for Chinese Patent Application No. 201810502994.5 dated Jun. 27, 2019.

(Continued)

*Primary Examiner* — Stephone B Allen
*Assistant Examiner* — Adam W Booher
(74) *Attorney, Agent, or Firm* — Calfee, Halter & Griswold LLP (57) ABSTRACT

An optical film, a fabrication method thereof, a windshield, and a driving apparatus, which pertains to the field of in-vehicle devices. The optical film includes a birefringent layer. The birefringent layer splits light transmitted through the optical film into two light beams, and exit directions of the two light beams are different from each other. A head up display is disposed above an instrument panel, and the optical film is disposed on a windshield. Light incident into an automobile through the windshield is split into two light beams. By adjusting relative positions of the head up display and the optical film, it is possible to enable only one of the (Continued)

light beams to be incident into the head up display. Since the total amount of light entering the head up display is reduced, the temperature rise inside the head up display can be mitigated.

4 Claims, 10 Drawing Sheets

(58) Field of Classification Search
CPC .. G02B 27/0101; G02B 27/28; G02B 27/286; G02B 27/01; G02B 27/10; G02B 27/283; G02B 27/281; G02B 27/285; B60K 35/00; B60K 2370/1529
See application file for complete search history.

(56) References Cited

U.S. PATENT DOCUMENTS

| | | | |
|---|---|---|---|
| 5,914,811 A * | 6/1999 | Chen | G02B 27/285 |
| | | | 359/489.06 |
| 2002/0012169 A1* | 1/2002 | Kashima | G02B 6/0056 |
| | | | 359/489.11 |
| 2007/0024781 A1 | 2/2007 | Choi et al. | |
| 2013/0279016 A1 | 10/2013 | Finger | |
| 2016/0327788 A1* | 11/2016 | Yamaoka | G02B 27/0101 |
| 2018/0180878 A1 | 6/2018 | Yokoe et al. | |
| 2019/0204627 A1 | 7/2019 | Wang et al. | |

FOREIGN PATENT DOCUMENTS

| | | |
|---|---|---|
| CN | 105372875 A | 3/2016 |
| CN | 107054202 A | 8/2017 |
| CN | 107735718 A | 2/2018 |
| CN | 108761618 A | 11/2018 |
| DE | 19803986 A1 | 8/1998 |
| JP | H02152102 A | 6/1990 |

OTHER PUBLICATIONS

Second Office Action for Chinese Patent Application No. 201810502994.5 dated Dec. 17, 2019.

* cited by examiner

OPTICAL FILM, FABRICATION METHOD THEREOF, WINDSHIELD AND DRIVING APPARATUS

RELATED APPLICATIONS

The present application is a 35 U.S.C. 371 national stage application of PCT International Application No. PCT/CN2019/075789, filed on Feb. 22, 2019, which claims the benefit of Chinese Patent Application No. 201810502994.5, filed on May 23, 2018, the entire disclosure of which is incorporated herein by reference.

TECHNICAL FIELD

The present disclosure relates to the field of in-vehicle apparatus, and particularly to an optical film, a fabrication method thereof, a windshield, and a driving apparatus.

BACKGROUND

The head up display (HUD) was previously a device used on aircraft. The head up display is capable of displaying data of various instruments on the windshield of the aircraft, so that the driver is able to view the instrument panel data without moving the line of sight to the instrument panel, which greatly facilitates the driver's operation of the aircraft. Currently, the head up display is also increasingly used in automobiles.

SUMMARY

Embodiments of the present disclosure provide an optical film, a fabrication method thereof, a windshield, and a driving apparatus.

A first embodiment of the present disclosure provides an optical film including a birefringent layer; the birefringent layer splitting light transmitted through the optical film into two light beams. The exit directions of the two light beams are different from each other.

In certain exemplary embodiments, the optical film further includes a cured resin layer, the birefringent layer is on the resin layer, and an ordinary light refractive index of the birefringent layer is same to a refractive index of the resin layer.

In certain exemplary embodiments, the resin layer includes two surfaces substantially parallel to each other; the birefringent layer also includes two surfaces substantially parallel to each other.

In certain exemplary embodiments, the resin layer has a first surface and a second surface opposite to each other; the first surface is a flat surface, and the second surface is provided with a plurality of V-shaped grooves parallel to each other; the birefringent layer is on the second surface, and the birefringent layer includes a surface parallel to the first surface.

In certain exemplary embodiments, the V-shaped groove has a first inner wall and a second inner wall, an angle between the second inner wall and the first surface being larger than an angle between the first inner wall and the first surface, the angle between the first inner wall and the first surface being 30° to 40°, an angle between the first inner wall and the second inner wall being 20° to 30°.

In certain exemplary embodiments, the birefringent layer includes a cured liquid crystal layer, short axes of all liquid crystal molecules in the liquid crystal layer being parallel to each other.

In certain exemplary embodiments, the liquid crystal layer is doped with a resin.

A second embodiment of the present disclosure provides a fabrication method of an optical film, the fabrication method including: providing a planar carrier; forming an optical film on the planar carrier; the optical film including a birefringent layer, the birefringent layer splitting light transmitted through the optical film into two light beams, the exit directions of the two light beams being different from each other; and separating the optical film from the planar carrier.

In certain exemplary embodiments, forming the optical film on the planar carrier includes: forming a birefringent layer on the planar carrier; the birefringent layer being on the resin layer, an ordinary light refractive index of the birefringent layer being same to a refractive index of the resin layer.

In certain exemplary embodiments, the resin layer includes two surfaces substantially parallel to each other; the birefringent layer also includes two surfaces substantially parallel to each other.

In certain exemplary embodiments, forming the resin layer on the birefringent layer includes: providing a substrate, a side of the substrate being provided with a resin layer, the resin layer having a first surface and a second surface opposite to each other, the first surface being a flat surface, the first surface being attached to the substrate; disposing a plurality of V-shaped grooves parallel to each other on the second surface; and arranging the birefringent layer on the second surface, the birefringent layer including a surface parallel to the first surface.

In certain exemplary embodiments, the V-shaped groove has a first inner wall and a second inner wall, an angle between the second inner wall and the first surface being larger than an angle between the first inner wall and the first surface, the angle between the first inner wall and the first surface being 30° to 40°, an angle between the first inner wall and the second inner wall being 20° to 30°.

A third embodiment of the present disclosure further provides a windshield including a glass body and any of the optical films described above which is disposed on the glass body.

A fourth embodiment of the present disclosure further provides a driving apparatus including a head up display and the windshield described above, the head up display being disposed under the windshield, the optical film being disposed on the windshield corresponding to the head up display, so that one of the two light beams split by the optical film can be irradiated on the head up display.

In certain exemplary embodiments, the head up display includes a housing and a display assembly disposed inside the housing; the housing having a light exit opening, the light exit opening being covered by a polarizer; the polarizer being capable of absorbing light that is transmitted through the optical film and irradiated onto the polarizer, and being capable of transmitting light emitted by the display assembly.

BRIEF DESCRIPTION OF THE DRAWINGS

In order to more clearly illustrate the technical solutions in embodiments of the disclosure, the appended drawings needed to be used in the description of the embodiments will be briefly introduced below. Obviously, the drawings in the following description are only some embodiments of the disclosure, and for those of skilled in the art, other drawings may be obtained according to these drawings without creative work.

FIG. 1 is a schematic diagram illustrating transmission of light by an optical film provided by an embodiment of the present disclosure.

DETAILED DESCRIPTION OF THE DISCLOSURE

In the following, the technical solutions in the embodiments of the disclosure will be clearly and completely described in connection with the drawings in the embodiments of the disclosure. Obviously, the described embodiments are only part of the embodiments of the disclosure, rather than all embodiments. Based on the embodiments in the disclosure, all other embodiments obtained by those of skilled in the art without creative efforts are all within the protection scope of the disclosure.

A head up display is usually disposed on the instrument panel of an automobile. The head up display has a projection port. Images displayed by the head up display are projected onto the windshield via the projection port, and can be observed by the driver after being reflected by the windshield. When an automobile is driven outdoors, ambient light (such as sunlight) may be incident into the interior of the head up display through the projection port after being transmitted through the windshield, which results in a temperature rise inside the head up display, affecting the normal operation of the head up display.

Figure 1:
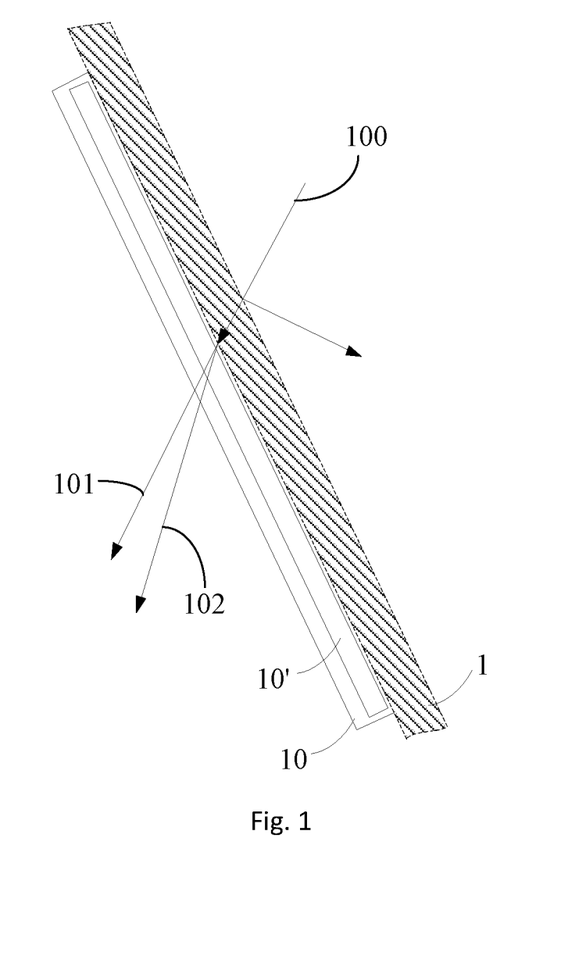

An embodiment of the present disclosure provides an optical film, which is applied to a windshield. FIG. 1 is a schematic diagram illustrating transmission of light by an optical film provided by an embodiment of the present disclosure. As shown in FIG. 1, an optical film 10 is configured to be capable of splitting light transmitted through the optical film into two light beams (such as two outgoing lights 101 and 102 in FIG. 1), and the exit directions of the two light beams are different from each other.

As shown in FIG. 1, the optical film 10 is disposed on the inner side of a windshield 1 (i.e., the side of the windshield facing the cab), and ambient light 100 (including sunlight on the outer side of the windshield) is irradiated to the windshield 1. A part of the light is transmitted through the windshield 1 and incident into the optical film 10. Since the optical film 10 is capable of splitting the light transmitted through the optical film 10 into two light beams, the same light beam transmitted through the windshield 1 is split into two light beams after being incident into the optical film 10 at the same incident angle from the same point, and the propagation directions of the two light beams form a certain angle.

As shown in FIG. 1, the optical film 10 includes a birefringent layer 10'. The birefringent layer 10' splits light transmitted through the optical film into two light beams, and the exit directions of the two light beams are different from each other.

The optical film is capable of splitting transmitted light into two light beams, and the exit directions of the two light beams are different from each other. Therefore, a head up display is disposed above the instrument panel, and the optical film is disposed on the windshield. Light incident into an automobile through the windshield is split into two light beams. By adjusting relative positions of the head up display and the optical film, it is possible to enable only one of the light beams to be incident into the head up display. Since the total amount of light entering the head up display is reduced, the temperature rise inside the head up display can be mitigated.

The optical film 10 may include a birefringent layer 10'. Light undergoes birefringence in the birefringent layer 10' to generate a birefringence phenomenon, and is split into two polarized light beams whose vibration directions are perpendicular to each other. The two polarized light beams propagate along different directions. For example, the light is split into a beam of P light and a beam of S light propagating along different directions.

When the ambient light is incident into the windshield 1 at the Brewster angle, light reflected by the windshield 1 and light transmitted through the windshield 1 are perpendicular to each other, and the light reflected by the windshield 1 is linearly polarized light (the linearly polarized light is S light). The light transmitted through the windshield 1 includes two types of light (for example, S light and P light) whose polarization directions are perpendicular to each other. Since the windshield 1 reflects a part of the linearly polarized light, in the two types of transmitted light whose polarization directions are perpendicular to each other, the intensity of the S light is less than that of the P light. At that time, by adjusting the head up display, the S light transmitted through the windshield is irradiated into the head up display, so that the total amount of light entering the head up display can be further reduced.

Figure 2:
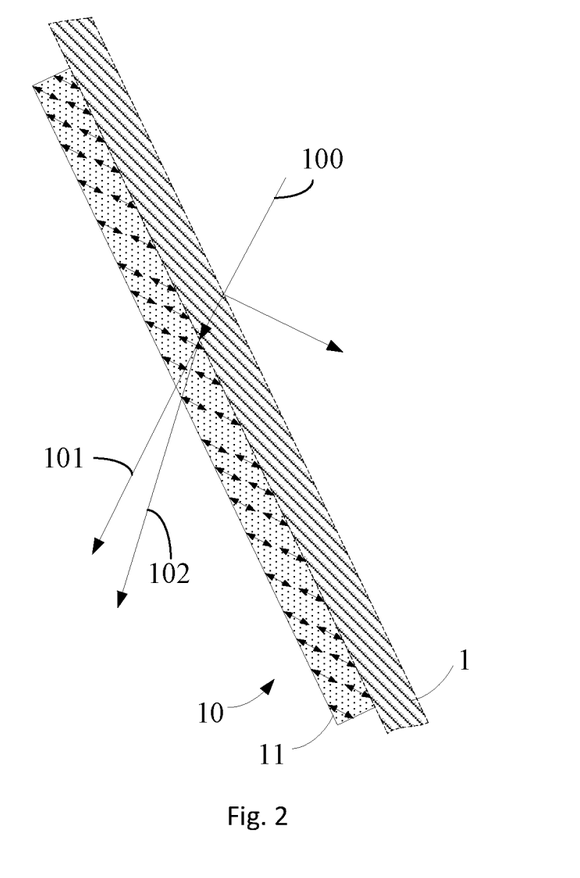
FIG. 2 is a local structural schematic diagram of an optical film provided by an embodiment of the present disclosure.

In one implementation of the present disclosure, the birefringent layer may include a cured liquid crystal layer. FIG. 2 is a local structural schematic diagram of an optical film provided by an embodiment of the present disclosure, wherein double-headed arrows in the optical film 10 represent the long axes of the liquid crystal molecules. The short axes of all the liquid crystal molecules in the liquid crystal layer 11 are parallel to each other, and the long axes of all the liquid crystal molecules in the liquid crystal layer 11 are parallel to each other. Birefringence of the liquid crystal can be utilized to split a light beam into two light beams, which is easy to realize. The polarization directions of the two light beams split by the liquid crystal are perpendicular to each other.

When the optical film shown in FIG. 2 is selected according to the windshield 1, the short-axis refractive index of the liquid crystal molecules of the liquid crystal layer 11 is 95% to 105% of the refractive index of the windshield 1, and setting the short-axis refractive index of the liquid crystal layer 11 to be close to the refractive index of the windshield 1 can reduce the influence of arrangement of the optical film 11 on the transparency of the windshield 1.

Figure 3:
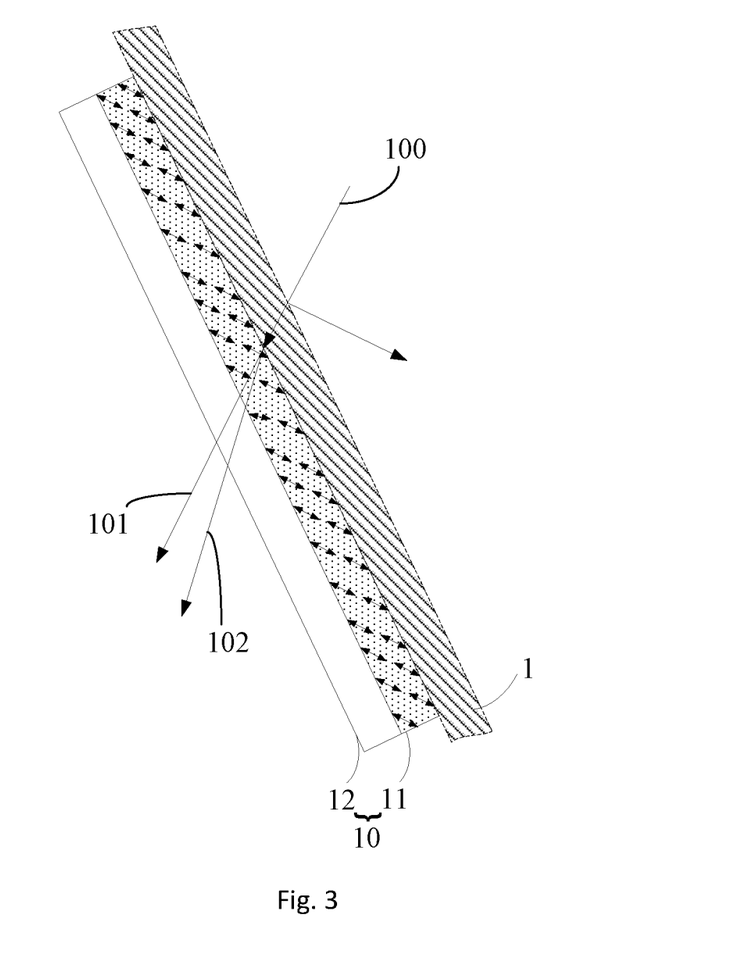
FIG. 3 is a local structural schematic diagram of an optical film provided by an embodiment of the present disclosure.

The optical film may further include a cured resin layer on which the birefringent layer is located. The ordinary light refractive index of the birefringent layer is same to the refractive index of the resin layer. When the birefringent layer includes a cured liquid crystal layer, the ordinary light refractive index of the birefringent layer is the short-axis refractive index of the liquid crystal layer. This embodiment will be described based an example in which the birefringent layer includes a cured liquid crystal layer 11. FIG. 3 is a local structural schematic diagram of another optical film provided by an embodiment of the present disclosure. As shown in FIG. 3, the optical film may further include a cured resin layer 12 on which the liquid crystal layer 11 is located. The short-axis refractive index of the liquid crystal molecules is same to the refractive index of the resin layer 12. The resin layer 12 can serve as a carrier of the liquid crystal layer 11. When the optical film 10 is attached to the windshield 1, the liquid crystal layer 11 is located between the windshield 1 and the resin layer 12, and the resin layer 12 can protect the liquid crystal layer 11. The refractive index of the windshield and the refractive index of the liquid crystal molecules in the short-axis direction may both be same to the refractive index of the resin layer.

In certain exemplary embodiments, as shown in FIG. 3, the resin layer 12 includes two surfaces substantially parallel to each other, and the birefringent layer (i.e., liquid crystal layer) 11 also includes two surfaces substantially parallel to each other. As shown in FIG. 3, two opposite surfaces of the resin layer 12 may be flat surfaces parallel to each other, so that the resin layer 12 has a uniform thickness and is convenient to fabricate.

In certain exemplary embodiments, the resin layer has a first surface and a second surface opposite to each other. The first surface is a flat surface, and the second surface is provided with a plurality of V-shaped grooves parallel to each other. The birefringent layer is located on the second surface, and the birefringent layer includes a surface parallel to the first surface.

Figure 4:
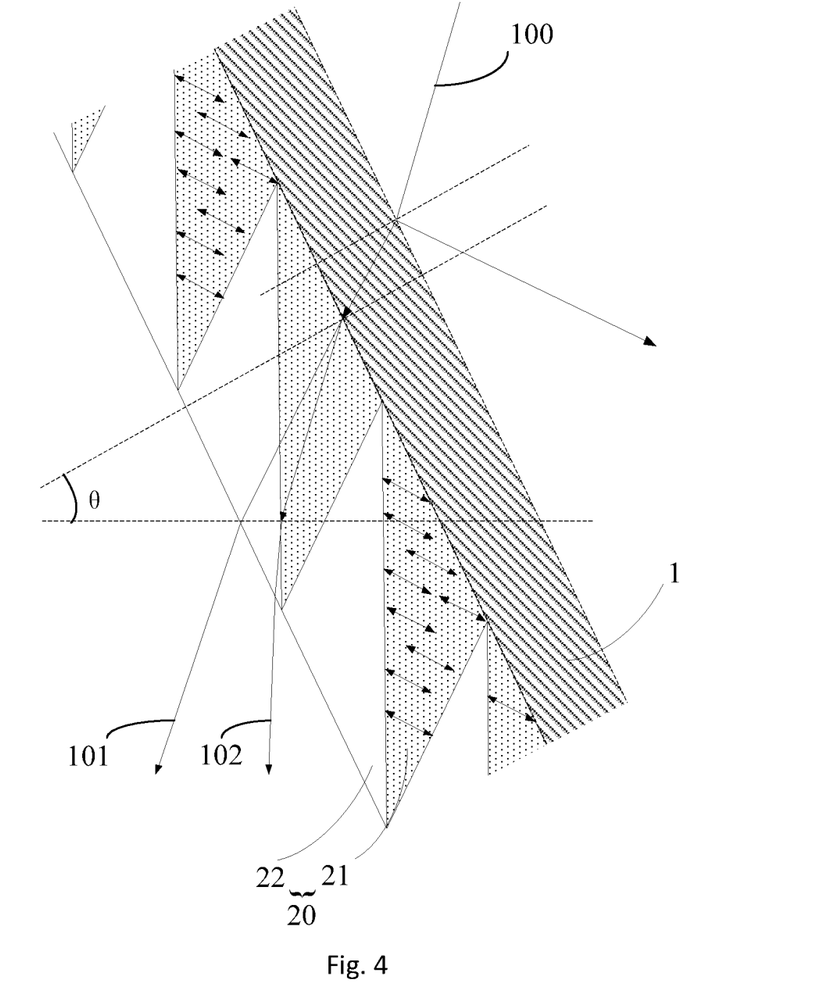
FIG. 4 is a local structural schematic diagram of an optical film provided by an embodiment of the present disclosure.
Figure 5:
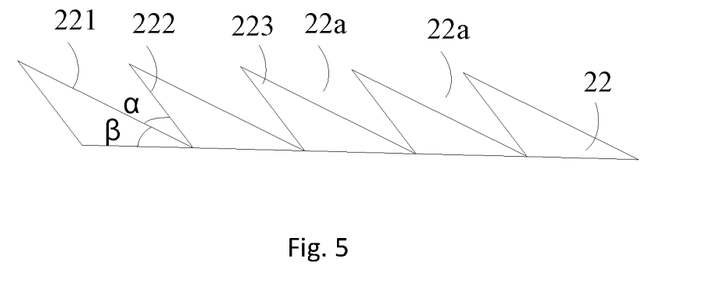
FIG. 5 is a local structural schematic diagram of a resin layer of the optical film shown in FIG. 4.

FIG. 4 is a local structural schematic diagram of another optical film provided by an embodiment of the present disclosure. In order to facilitate exhibition of the optical path, the double-headed arrows close to the illustrated optical path for indicating the long axes of the liquid crystal molecules are removed in FIG. 4. As shown in FIG. 4, the optical film 20 also includes a cured resin layer 22. FIG. 5 is a local structural schematic diagram of the resin layer of the optical film shown in FIG. 4. Unlike the optical film shown in FIG. 3, in the optical film shown in FIG. 4, the resin layer 22 has a first surface and a second surface opposite to each other. The first surface is a flat surface, the second surface is provided with a plurality of V-shaped grooves 22a parallel to each other, and the liquid crystal layer 21 is located on the second surface. Since the second surface is provided with a plurality of V-shaped grooves 22a, the cross section of the second surface is serrated. The cross section of the second surface is a section perpendicular to the extending direction of the V-shaped groove 22a. For example, in the case where the vibration direction of the S light is same to the short-axis direction of the liquid crystal molecules, after the V-shaped groove 22a is provided, for the S-light incident into the liquid crystal layer 21 along the short-axis direction of the liquid crystal molecules, since the short-axis refractive index of the liquid crystal molecules is same to the refractive index of the resin layer 22, the S light is not deflected when passing through an interface between the resin layer 22 and the liquid crystal layer 21. The P light will be deflected at the interface between the resin layer 22 and the liquid crystal layer 21, so that after passing through the optical film 20, the exit direction of the P light will be more different from the exit direction of the S light, and the P light and the S light will be separated more significantly. This can greatly reduce the thickness of the optical film 20 as compared with the optical films shown in FIGS. 2 and 3.

FIG. 4 also shows an optical path diagram in which ambient light is sequentially transmitted through the windshield and the optical film. The two surfaces of the windshield 1 are parallel to each other, and the two surfaces of the optical film 20 are parallel to each other. The angle θ between the normal when light is refracted at the interface between the liquid crystal layer 21 and the resin layer 22 and the normal when light is refracted at the interface between the liquid crystal layer 21 and the windshield 1 is an acute angle. According to the optical path diagram shown in FIG. 4, the ambient light 100 can be split into two light beams (102 and 101 as shown in FIG. 4) emitted in different directions after passing through the windshield 1 and the optical film 20 in sequence. The polarization directions of the two light beams are perpendicular to each other.

As shown in FIG. 5, each of the V-shaped grooves 22a has a V-shaped cross section. For example, in a V-shaped groove, the V-shaped groove 22a includes a first inner wall 221 and a second inner wall 222. The angle between the second inner wall 222 and the first surface is greater than the angle between the first inner wall 221 and the first surface. The angle α between the first inner wall 221 and the second inner wall 222 is 20° to 30°, and the angle β between the first inner wall 221 and the first surface of the resin layer 22 is 30° to 40°. Setting the angle α and the angle β within these ranges enables most of the ambient light to be irradiated onto the first inner wall 221, so that the angle between the two split light beams is larger. If the angle α and the angle β are too small, a serrated top 223 after curing is prone to breakage.

In certain exemplary embodiments, the thickness of the optical film 20 may be 1 to 20 mm. The larger the thickness of the optical film 20 is, the more significantly the P light and the S light will be separated. However, setting the thickness to be too large will decrease the transparency of the windshield 1. Generally, the thickness ranging from 1 mm to 20 mm can ensure good transparency of the windshield, and also make the P light and the S light separated large enough.

In the optical films shown in FIGS. 2 to 4, the liquid crystal layer includes cross-linkable, curable liquid crystal molecules. The polymerizable liquid crystal contains polymerizable unsaturated functional groups, which may form a liquid crystal polymer network by ultraviolet irradiation or like to cure the liquid crystal.

In another implementation, the liquid crystal layer may also be doped with a resin. When the liquid crystal layer is being formed, a small amount of resin is first doped into the liquid crystal, which can decrease the viscosity of the liquid crystal. If the viscosity of the liquid crystal is large upon fabrication, a small amount of resin may be doped to facilitate fabrication of the liquid crystal layer. The resin may be uniformly doped into the liquid crystal, so that the viscosity of the liquid crystal everywhere can be decreased, which facilitates formation of a liquid crystal layer having a uniform thickness.

Upon implementation, the resin doped in the liquid crystal layer may include a cross-linkable, curable, double-bond and low-viscosity small molecule polymer or monomer, such as at least one of n-pentene, methacrylic acid, and a single stranded olefin. The viscosity of the liquid crystal is decreased by doping the liquid crystal with a substance having a lower viscosity.

Figure 6:
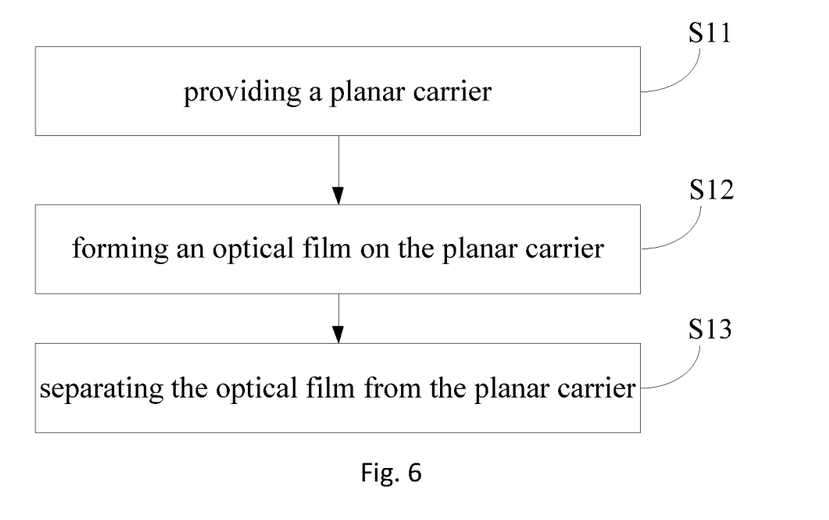
FIG. 6 is a flow chart of a method for fabricating an optical film provided by an embodiment of the present disclosure.

FIG. 6 is a flow chart of a method for fabricating an optical film provided by an embodiment of the present disclosure. This method is applicable to the optical film shown in FIG. 1. As shown in FIG. 6, the fabrication method includes the following steps.

S11: providing a planar carrier. The planar carrier may be a substrate.

S12: forming an optical film on the planar carrier. The optical film includes a birefringent layer that splits light transmitted through the optical film into P light and S light, and the exit direction of P light and exit direction of S light are different from each other.

S13: separating the optical film from the planar carrier.

The optical film is capable of splitting the transmitted light into two light beams, and the exit directions of the two light beams are different from each other. Therefore, a head up display is disposed above the instrument panel, and the optical film is disposed on the windshield. Light incident into an automobile through the windshield is split into two light beams. By adjusting relative positions of the head up display and the optical film, it is possible to enable only one of the light beams to be incident into the head up display. Since the total amount of light entering the head up display is reduced, the temperature rise inside the head up display can be mitigated.

Upon implementation, the two light beams split by the optical film may both be polarized light, and the polarization directions of the two light beams are perpendicular to each other. For example, the split two light beams may be a beam of P light and a beam of S light.

Figure 7:
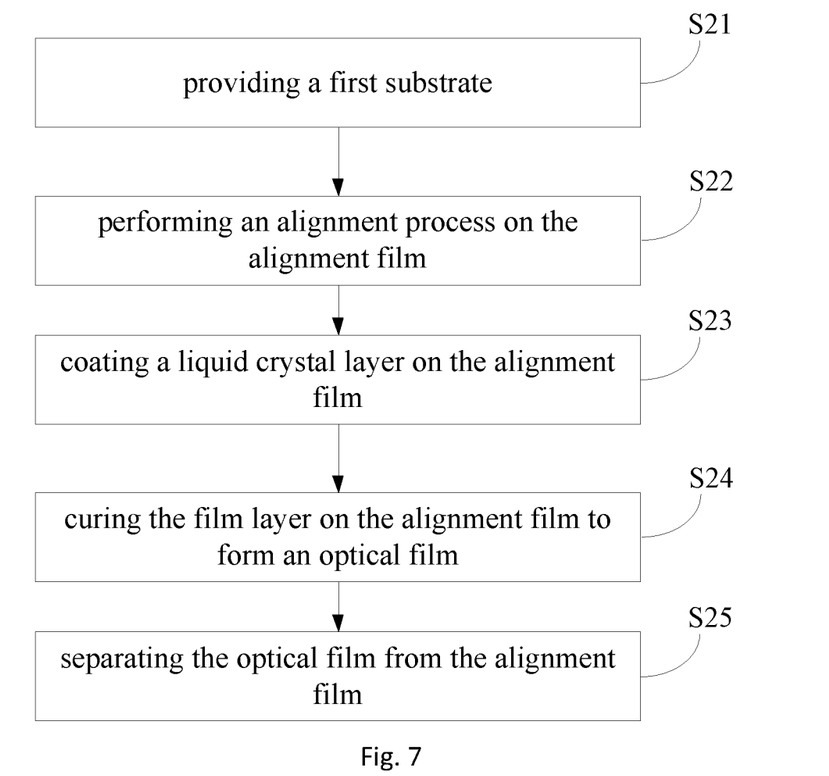
FIG. 7 is a flow chart of a method for fabricating an optical film provided by an embodiment of the present disclosure.

The birefringent layer may include a cured liquid crystal layer. This embodiment will be described based on an example in which the birefringent layer includes a cured liquid crystal layer. FIG. 7 is a flow chart of another method for fabricating an optical film provided by an embodiment of the present disclosure. This method is applicable to the optical film shown in FIG. 2, and the fabrication method includes the following steps.

Figure 8:
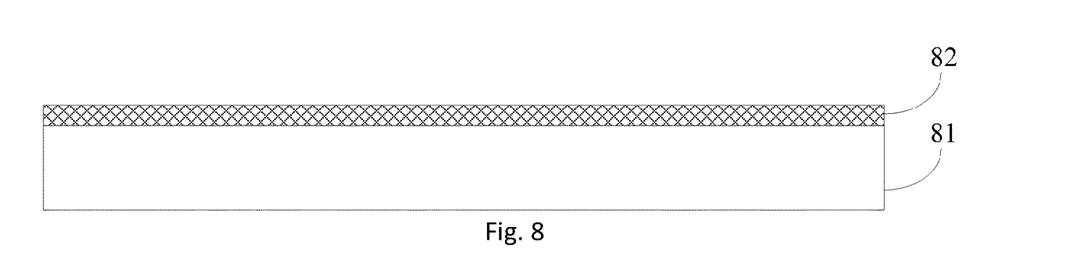
FIGS. 8 to 9 are schematic diagrams illustrating a process of fabricating an optical film provided by an embodiment of the present disclosure.

S21: providing a first substrate. As shown in FIG. 8, an alignment film 82 is formed on a surface of a first substrate 81. The alignment film 82 is usually made of PI (Polyimide Film).

S22: performing an alignment process on the alignment film. Specifically, rubbing alignment or photo-alignment may be employed. Specific operations of the rubbing alignment and the photo-alignment may employ operations of conventional rubbing alignment and photo-alignment.

Figure 9:
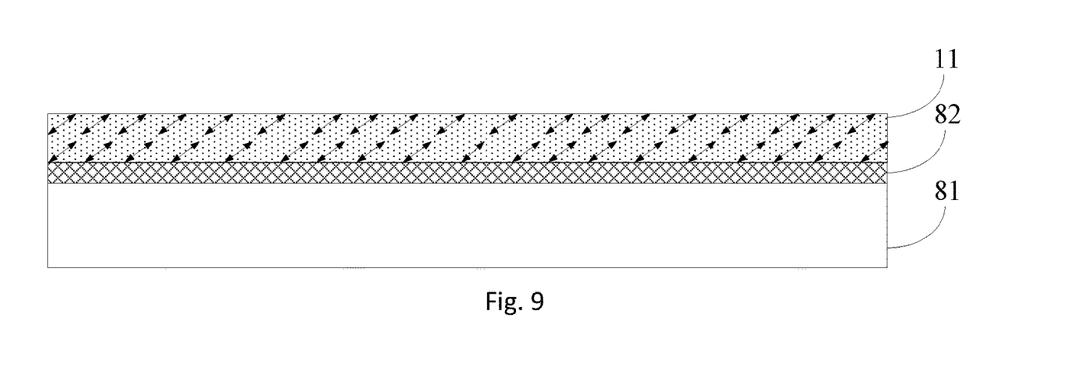

S23: coating a liquid crystal layer on the alignment film. As shown in FIG. 9, after alignment of the alignment film 82 is finished, a liquid crystal may be coated on the alignment film 82 to form a liquid crystal layer 11. Since the alignment film has been subjected to rubbing alignment or photo-alignment, after the liquid crystal is coated on the alignment film 82, the long axis or the short axis of the liquid crystal can be oriented to a fixed direction. During the process of coating the liquid crystal, the liquid crystal may be heated to decrease the viscosity of the liquid crystal so that a liquid crystal layer having a uniform thickness can be formed on the alignment film.

In certain exemplary embodiments, the liquid crystal coated in step S23 is a polymerizable liquid crystal. The polymerizable liquid crystal contains polymerizable unsaturated functional groups, which may form a liquid crystal polymer network by ultraviolet irradiation or the like to cure the liquid crystal.

Prior to uniformly coating the liquid crystal, the liquid crystal may be doped with a resin. By doping a small amount of resin into the liquid crystal, the viscosity of the liquid crystal may also be decreased, so that the heating time is reduced or heating does not need to be performed, which facilitates formation of a liquid crystal layer having a uniform thickness. The resin may be uniformly doped into the liquid crystal layer, so that the viscosity of the liquid crystal everywhere can be decreased.

In other embodiments, the liquid crystal layer may also be doped with a cross-linkable, curable, double-bond and low-viscosity small molecule polymer or monomer, such as at least one of n-pentene, methacrylic acid, and a single stranded olefin. The viscosity of the liquid crystal is decreased by doping the liquid crystal with a substance having a lower viscosity.

S24: curing the film layer on the alignment film to form an optical film. Upon implementation, the liquid crystal layer 11 may be cured by ultraviolet irradiation.

S25: separating the optical film from the alignment film. The optical film separated from the alignment film 82 is the optical film shown in FIG. 2.

Figure 10:
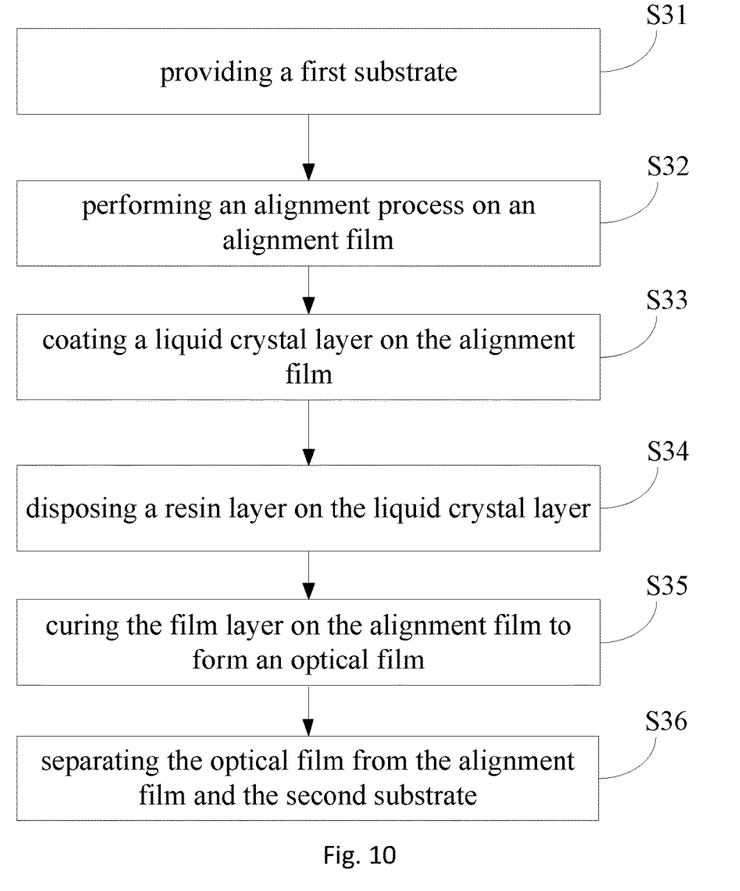
FIG. 10 is a flow chart of a method for fabricating an optical film provided by an embodiment of the present disclosure.

FIG. 10 is a flow chart of another method for fabricating an optical film provided by an embodiment of the present disclosure. This method is applicable to the optical film shown in FIG. 3. As shown in FIG. 10, the fabrication method includes the following steps.

S31: providing a first substrate. Step S31 is same to step S21 described above, and will not be described in detail herein.

S32: performing an alignment process on an alignment film. Step S32 is same to step S22 described above, and will not be described in detail herein.

S33: coating a liquid crystal layer on the alignment film. Step S33 is same to step S23 described above, and will not be described in detail herein.

S34: disposing a resin layer on the liquid crystal layer, wherein the short-axis refractive index of the liquid crystal molecules is same to the refractive index of the resin layer.

Figure 11:
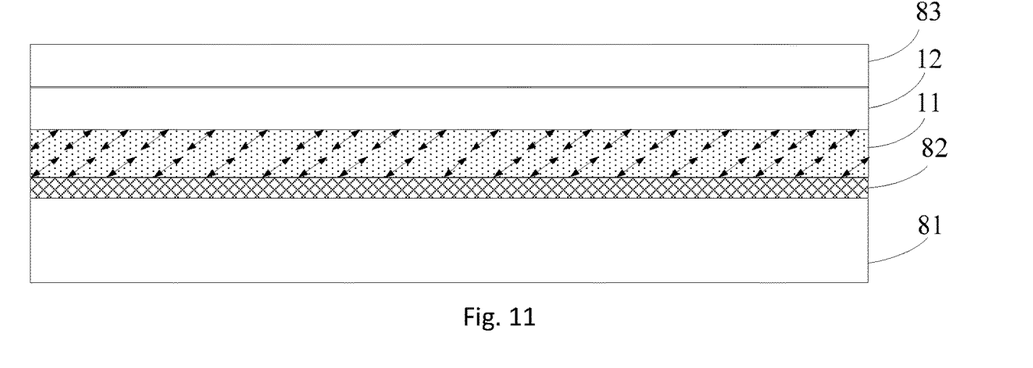
FIG. 11 is a schematic diagram illustrating a process of fabricating an optical film provided by an embodiment of the present disclosure.

As shown in FIG. 11, a second substrate 83 may be specifically disposed, a resin is coated on the second substrate 83 to form a resin layer 12, and the second substrate 83 is then covered on the liquid crystal layer 11, so that the resin layer 12 and the liquid crystal layer 11 are sandwiched between the first substrate 81 and the second substrate 83.

S35: curing the film layer on the alignment film to form an optical film. Specifically, the liquid crystal layer 11 may be cured by ultraviolet irradiation. The first substrate 81 and the second substrate may be transparent substrates, which facilitates ultraviolet irradiation.

S36: separating the optical film from the alignment film and the second substrate. The optical film separated from the alignment film 82 and the second substrate 83 is the optical film shown in FIG. 3.

Thus, the resin layer 12 includes two surfaces substantially parallel to each other, and the birefringent layer (i.e., liquid crystal layer) 11 also includes two surfaces substantially parallel to each other.

Figure 12:
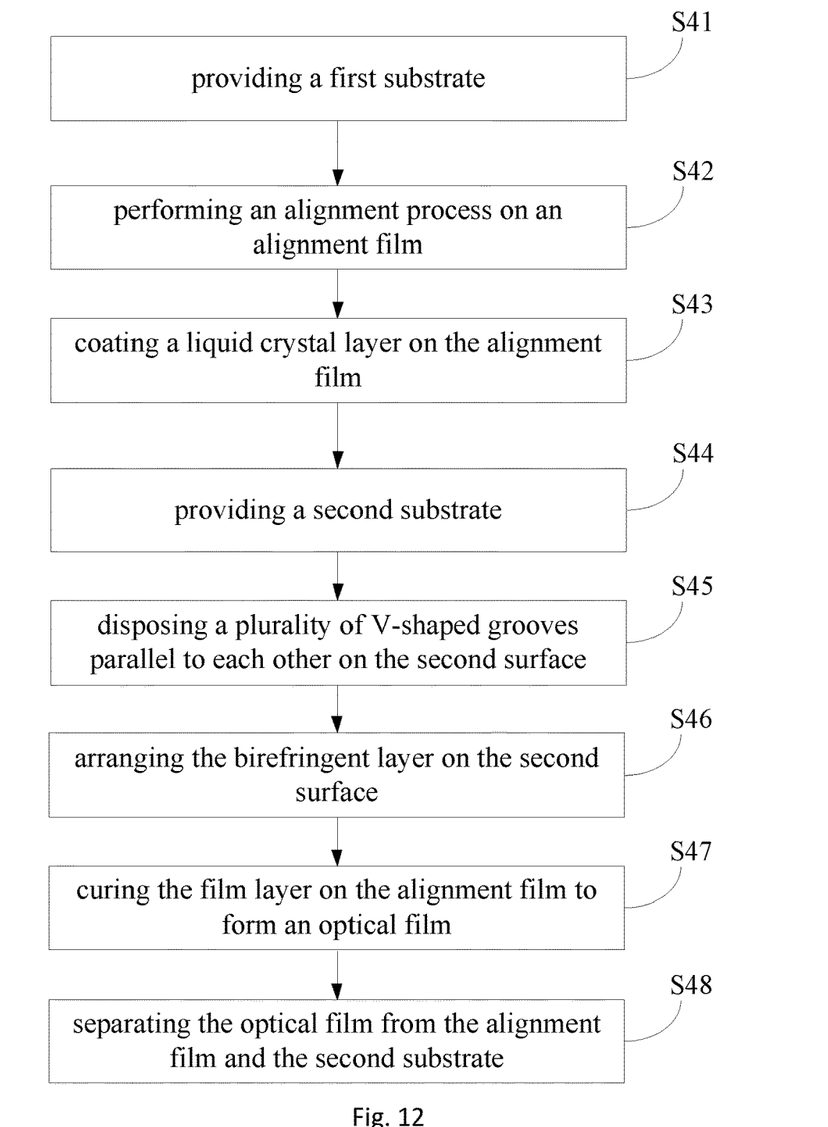
FIG. 12 is a flow chart of a method for fabricating an optical film provided by an embodiment of the present disclosure.

FIG. 12 is a flow chart of another method for fabricating an optical film provided by an embodiment of the present disclosure. This method is applicable to the optical film shown in FIG. 4. As shown in FIG. 12, the fabrication method includes the following steps.

S41: providing a first substrate. Step S41 is same to step S21 described above, and will not be described in detail herein.

S42: performing an alignment process on an alignment film. Step S42 is same to step S22 described above, and will not be described in detail herein.

S43: coating a liquid crystal layer on the alignment film. Step S43 is same to step S23 described above, and will not be described in detail herein.

Figure 13:
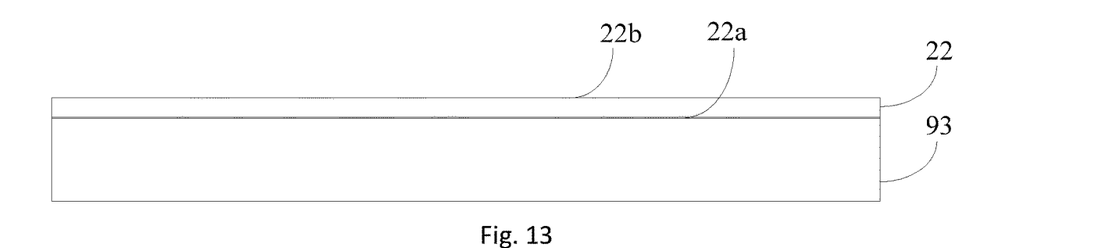
FIGS. 13 to 14 are schematic diagrams illustrating a process of fabricating an optical film provided by an embodiment of the present disclosure.

S44: providing a second substrate. As shown in FIG. 13, a resin layer 22 is disposed on a surface of a second substrate 93. The resin layer 22 has a first surface 22a and a second surface 22b opposite to each other. The first surface 22a is a flat surface, wherein the first surface 22a is attached to the second substrate 93. The resin layer 22 may be formed on the second substrate by coating and curing.

S45: disposing a plurality of V-shaped grooves parallel to each other on the second surface. The plurality of V-shaped grooves are disposed so that the cross section of the second surface 22b is serrated, wherein the cross section of the second surface 22b is a section perpendicular to the extending direction of the V-shaped groove.

Figure 14:
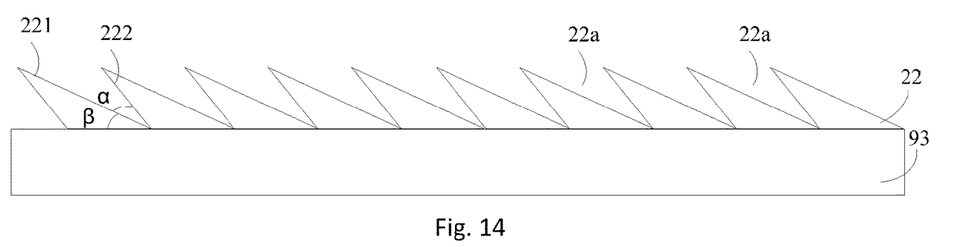

As shown in FIG. 14, each of the V-shaped grooves 22a has a V-shaped cross section. For example, in a V-shaped groove, the V-shaped groove 22a includes a first inner wall 221 and a second inner wall 222. The angle between the second inner wall 222 and the first surface is greater than the angle between the first inner wall 221 and the first surface. The angle α between the first inner wall 221 and the second inner wall 222 is 20° to 30°, and the angle β between the first inner wall 221 and the first surface of the resin layer 22 is 30° to 40°.

Upon implementation, the V-shaped groove 22a may be formed by machining a metal roller such as a copper roller.

Figure 15:
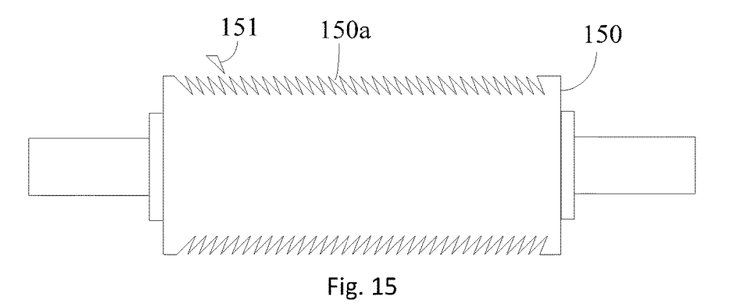
FIG. 15 is a local structural schematic diagram of a metal roller provided by an embodiment of the present disclosure.

FIG. 15 is a local structural schematic diagram of a metal roller provided by an embodiment of the present disclosure. As shown in FIG. 15, a plurality of annular grooves 150a may be machined on the surface of a metal roller 150. The metal roller 150 is rotated by a device (for example, an electric motor or the like), and the second substrate 93 provided with the resin layer 22 passes under the metal roller 150 at uniform speed. The metal roller 150 is rolled on the resin layer 22, and during the process of the second substrate 93 gradually passing under the metal roller 150, the portion of the resin layer that is passing under the metal roller 150 is subjected to curing by illumination. Since the resin material after curing has certain elasticity, after the resin material in contact with the metal roller 150 is cured, the metal roller 150 can be separated from the cured resin without causing damage to the resin material. When the second substrate 93 has entirely passed under the metal roller 150, the resin layer is completely cured, so that a plurality of V-shaped grooves 22a can be formed.

The annular groove 150a on the surface of the metal roller 150 may be machined by a diamond cutter 151. The shape of the annular groove 150a may be set according to the sectional shape of the V-shaped groove 22a to be formed on the resin layer 22.

Nickel may be further plated on the surface of the metal roller 150 after the annular groove 150a is machined on the surface of the metal roller 150. This makes the surface of the metal roller 150 smoother, which is advantageous for improving the machining precision of the resin layer 22.

Further, the resin layer 22 may also be machined by a tool other than the metal roller 150. For example, a sheet having a serrated edge is employed and placed perpendicular to the resin layer 22. The sheet scratches the surface of the resin layer 22 in a direction perpendicular to the sheet, while the portion of the resin layer 22 that has been scratched by the sheet is being cured by illumination. A plurality of V-shaped grooves 22a are scratched on the resin layer 22 by means of the serrated edge.

Alternatively, a prismatic tool is employed. One seamed edge of the prismatic tool is pressed into the resin layer 12 and the resin material on a side of the prismatic tool is cured. A V-shaped groove 22a is formed on the resin layer 22 after the prismatic tool is removed. A plurality of V-shaped grooves 22a can be machined one by one by the prismatic tool.

In another implementation, the plurality of V-shaped grooves on the resin layer may also be formed by a photolithography process.

Figure 16:
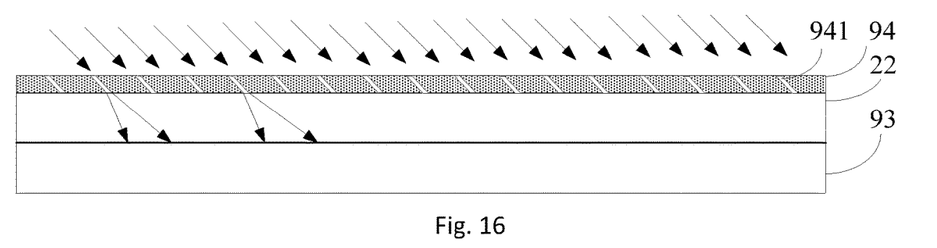
FIGS. 16 to 17 are schematic diagrams illustrating a process of fabricating an optical film provided by an embodiment of the present disclosure.

As shown in FIG. 16, a mask 94 may be disposed on the uncured resin layer 22. The mask 94 has a plurality of inclined slits 941. The resin layer 22 is irradiated with ultraviolet light through the slits 941. The ultraviolet light will be diffused at certain angles after passing through the slits 941. Regions of the resin layer 22 that are irradiated with ultraviolet light will be cured, and regions not irradiated with ultraviolet light will not be cured. After being irradiated with ultraviolet light for a period of time, the uncured resin is removed, so that a plurality of V-shaped grooves 22a are machined on the second surface.

Upon implementation, when the photoresist 94 is being illuminated, light is obliquely incident on the photoresist 94 to form a pattern in which the V-shaped groove 22a can be etched.

Figure 17:
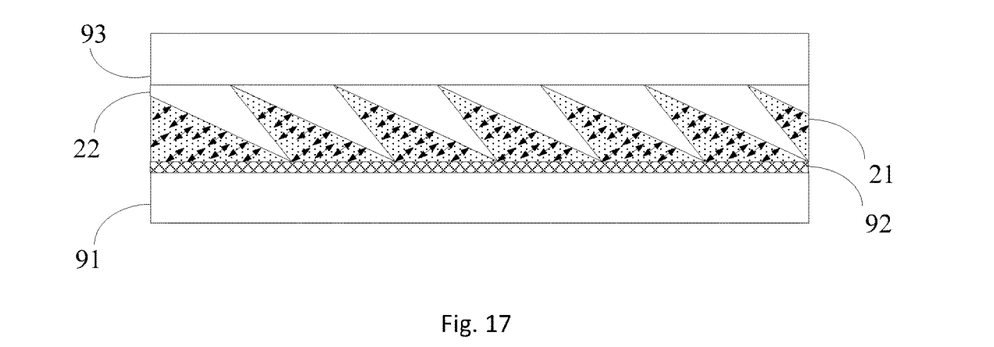

S46: arranging the birefringent layer (i.e., liquid crystal layer) on the second surface, the birefringent layer including a surface parallel to the first surface. As shown in FIG. 17, the first substrate 91 and the second substrate 93 are assembled, so that the resin layer 22 and the liquid crystal layer 21 are sandwiched between the first substrate 91 and the second substrate 93, and the second surface of the resin layer 22 is attached to the liquid crystal layer 21.

S47: curing the film layer on the alignment film to form an optical film. Step S47 is same to step S35 described above, and will not be described in detail herein.

S48: separating the optical film from the alignment film and the second substrate. The optical film separated from the alignment film 92 and the second substrate 93 is the optical film shown in FIG. 4.

After separation, the thickness of the optical film may be 1 mm to 20 mm. The greater the thickness of the optical film is, the more significantly the P light and the S light are separated. However, setting the thickness to be too large will reduce the transparency of the windshield. Generally, the thickness ranging from 1 mm to 20 mm can ensure good transparency of the windshield, and also make the P light and the S light separated large enough.

Upon implementation, steps S44 to S45 may also be performed prior to steps S41 to S43.

When the optical film is fabricated by the method shown in FIGS. 6 to 17, after the optical film is separated, the optical film may be cut to remove the edge of the optical film. Prior to curing the liquid crystal, the liquid crystal has certain fluidity, which results in nonuniform thickness at the edge of the resulting optical film. Cutting the edge can enhance the uniformity of the thickness of the optical film.

An embodiment of the present disclosure further provides a windshield. The windshield includes a glass body and an optical film disposed on the glass body, the optical film being any of the optical films described above.

Upon implementation, the optical film may be attached to the windshield. In addition, since the windshield is usually made from laminated glass, the optical film may also be embedded in the windshield.

The optical film is capable of splitting the transmitted light into two light beams, and the exit directions of the two light beams are different from each other. Therefore, a head up display is disposed above the instrument panel and the optical film is disposed on the windshield. Light incident into an automobile through the windshield is split into two light beams. By adjusting relative positions of the head up display and the optical film, it is possible to enable only one of the light beams to be incident into the head up display. Since the total amount of light entering the head up display is reduced, the temperature rise inside the head up display can be mitigated.

Figure 18:
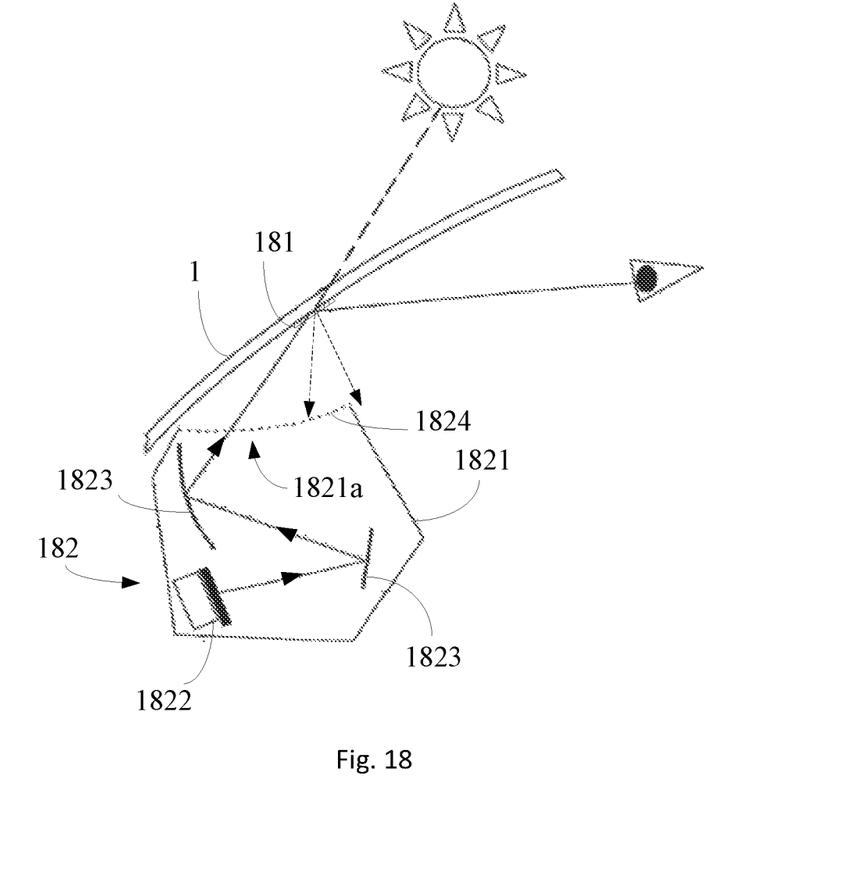
FIG. 18 is a local structural schematic diagram of a driving apparatus provided by an embodiment of the present disclosure.

When an optical film 181 is disposed on the windshield, the position where the optical film 181 is disposed can be adjusted according to the position the head up display is placed, so that one of the two light beams split after passing through the optical film 181 is irradiated onto the head up display, and the other cannot be irradiated onto the head up display, which can slow down the temperature rise inside the head up display. By irradiating the weaker one of the two light beams onto the head up display, the temperature rise inside the head up display can be further mitigated.

An embodiment of the present disclosure further provides a driving apparatus including a head up display and the windshield described above. The head up display is placed under the windshield, and the optical film is disposed on the windshield corresponding to the head up display, so that one of the two light beams split by the optical film can be irradiated onto the head up display.

FIG. 18 is a local structural schematic diagram of a driving apparatus provided by an embodiment of the present disclosure. As shown in FIG. 18, the head up display 182 may include a housing 1821 and a display assembly disposed within the housing. The housing 1821 has a light exit opening 1821a. A polarizer 1824 is covered on the light exit opening 1821a. The polarizer 1824 is configured to absorb light that is transmitted through the optical film 181 and then irradiated onto the polarizer 1824. In this embodiment, the polarizer 1824 is configured to absorb the S light and to transmit light emitted by the display assembly. After the head up display is placed on the instrument panel, by adjusting the position of the optical film 181, the P light split by the optical film 181 cannot be irradiated to the light exit opening 1821a, while only the S light is irradiated to the light exit opening 1821a. The S light is absorbed by the polarizer 1824, which can eliminate ambient light entering the interior of the housing 1821, and reduce light reflection formed at the light exit opening 1821a to avoid glare. This can further mitigate the temperature rise in the head up display caused by the ambient light. At the same time, since the polarizer 1824 is capable of transmitting light emitted from the display assembly, the head up display 182 can normally project an image on the windshield 1.

In another implementation of the present disclosure, the polarizer 1824 may also be configured to absorb the P light and to transmit light emitted by the display assembly. After the head up display is placed on the instrument panel, by adjusting the position of the optical film 181, the S light split by the optical film 181 cannot be irradiated to the light exit opening 1821a, while only the P light is irradiated to the light exit opening 1821a. The P light is absorbed by the polarizer 1824, which can eliminate ambient light entering the interior of the housing 1821, and reduce light reflection formed at the light exit opening 1821a to avoid glare. Since the polarizer 1824 is capable of transmitting light emitted from the display assembly, the head up display 182 can normally project an image on the windshield 1.

Those skilled in the art will readily appreciate that the display assembly in the head up display is typically a liquid crystal display assembly, and light emitted by the liquid crystal display assembly is typically polarized light. Therefore, light emitted by the liquid crystal display assembly can be transmitted through the polarizer without affecting the brightness of displayed images as long as the polarization direction of the light emitted by the liquid crystal display assembly is different from the polarization direction of the light that can be absorbed by the polarizer. In actual setting, if the light emitted by the display assembly in the head up display is P light, a polarizer that absorbs S light is arranged. Then, by adjusting the position of the optical film disposed on the windshield, S light transmitted through the optical film is irradiated onto the polarizer. If the light emitted by the display assembly in the head up display is S light, a polarizer that absorbs P light is arranged. Then, by adjusting the position of the optical film disposed on the windshield, P light transmitted through the optical film is irradiated onto the polarizer.

Light emitted by part of the liquid crystal display components may also be non-polarized light. At that time, light emitted by the liquid crystal display assembly can still be partially transmitted through the polarizer, so that the user is still able to observe the displayed images.

In actual setting, the optical film may be disposed only in partial regions on the windshield to reduce the area of the optical film used, thereby reducing the cost.

The structure of the display assembly inside the housing of the head up display may take the form of a display assembly inside the housing of a conventional head up display, and may include, for example, a liquid crystal display screen 1822 and reflective sheet 1823.

In certain exemplary embodiments, the driving apparatus may be an automobile, a ship, or a spacecraft.

The above embodiments are only used for explanations rather than limitations to the present disclosure, the ordinary skilled person in the related technical field, in the case of not departing from the spirit and scope of the present disclosure, may also make various modifications and variations. Therefore, all the equivalent solutions also belong to the scope of the present disclosure, and the patent protection scope of the present disclosure should be defined by the claims.

What is claimed is:

1. A driving apparatus comprising a head up display and a windshield, the head up display being disposed under the windshield, the windshield comprising a glass body and an optical film disposed on the glass body, the optical film being disposed on the windshield corresponding to the head up display;
  wherein the optical film comprises a birefringent layer and a cured resin layer; the birefringent layer splitting light transmitted through the optical film into two light beams, exit directions of the two light beams being different from each other, and one of the two light beams split by the optical film being irradiated on the head up display;
  wherein the birefringent layer is on the cured resin layer, and an ordinary light refractive index of the birefringent layer is same to a refractive index of the cured resin layer; and
  wherein the cured resin layer has a first surface and a second surface opposite to each other; the first surface is a flat surface, and the second surface is provided with a plurality of V-shaped grooves parallel to each other; the birefringent layer is on the second surface, and the birefringent layer comprises a surface parallel to the first surface.

2. The driving apparatus according to claim 1, wherein the head up display comprises a housing and a display assembly disposed inside the housing; the housing having a light exit opening, the light exit opening being covered by a polarizer; the polarizer being capable of absorbing light that is transmitted through the optical film and irradiated onto the polarizer, and being capable of transmitting light emitted by the display assembly.

3. The driving apparatus according to claim 1, wherein each V-shaped groove has a first inner wall and a second inner wall, an angle between the second inner wall and the first surface being larger than an angle between the first inner wall and the first surface, the angle between the first inner wall and the first surface being 30° to 40°, an angle between the first inner wall and the second inner wall being 20° to 30°.

4. The driving apparatus according to claim 1, wherein the birefringent layer comprises a cured liquid crystal layer, short axes of all liquid crystal molecules in the cured liquid crystal layer being parallel to each other.

* * * * *